Oct. 12, 1926.
J. H. FROME
1,603,201
EDUCATIONAL APPLIANCE
Original Filed July 17, 1925   2 Sheets-Sheet 1
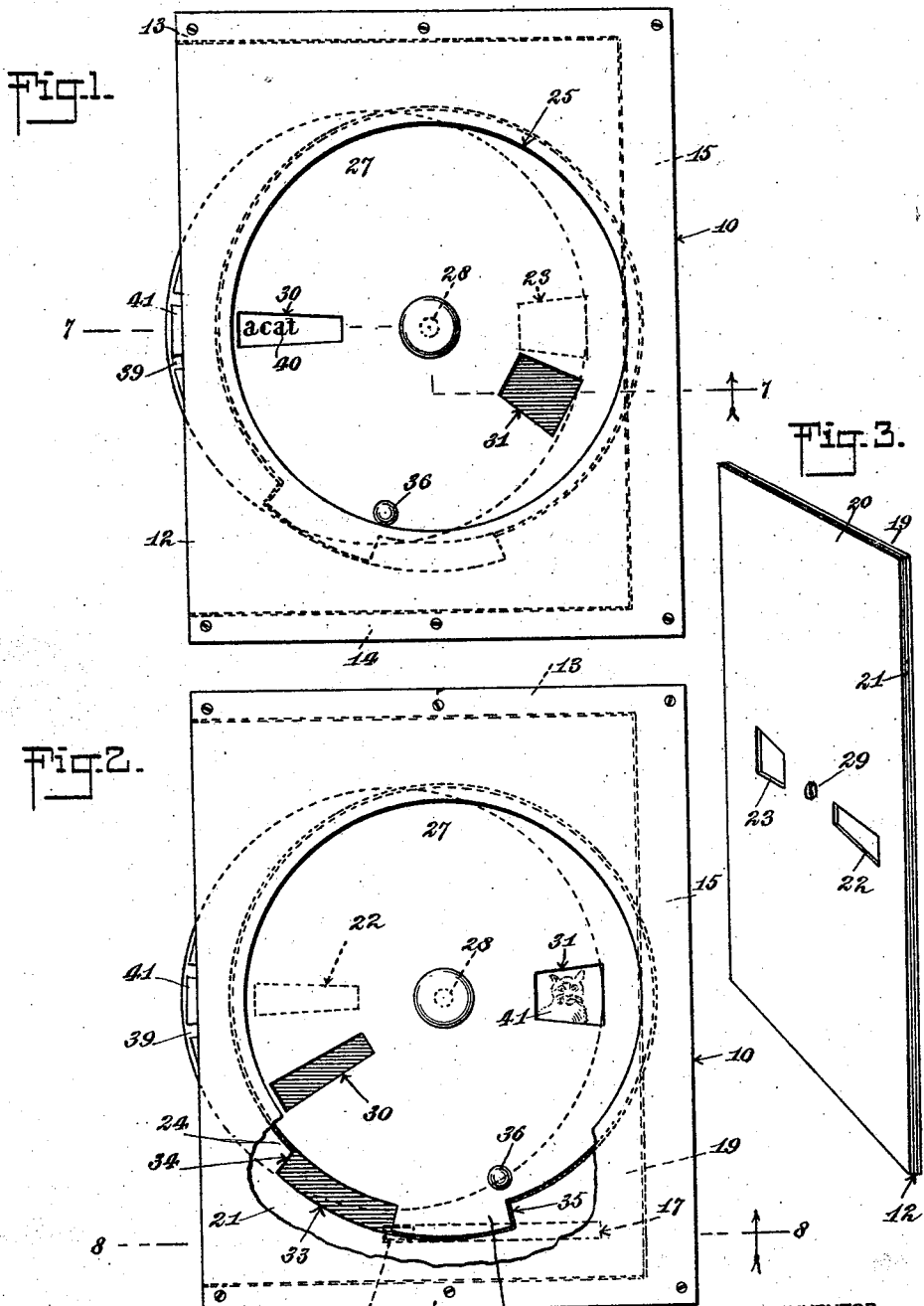
WITNESSES
INVENTOR
John H. Frome.
BY
ATTORNEYS Oct. 12, 1926.
J. H. FROME
1,603,201
EDUCATIONAL APPLIANCE
Original Filed July 17, 1925    2 Sheets-Sheet 2
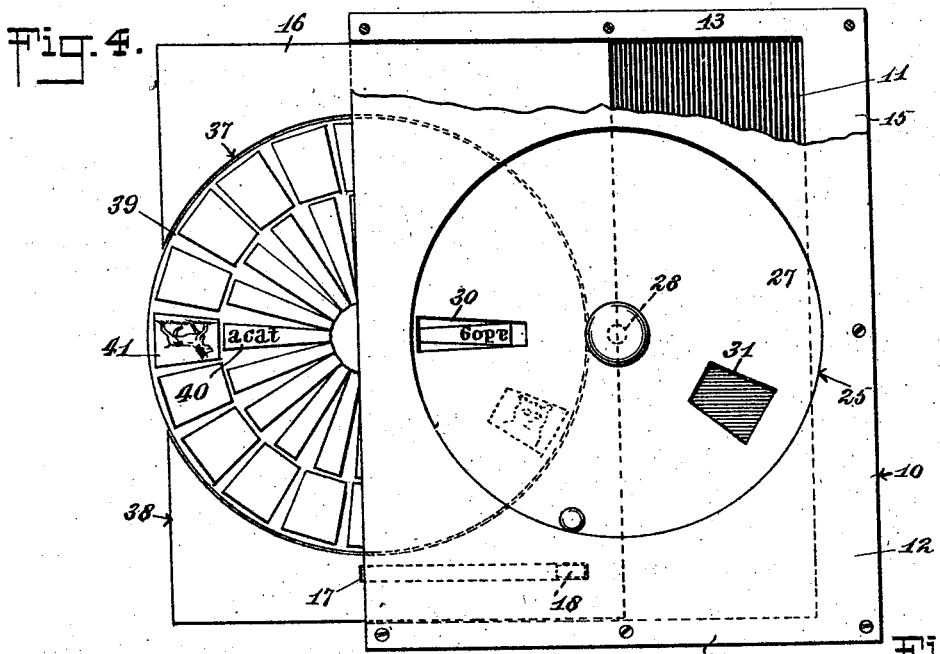
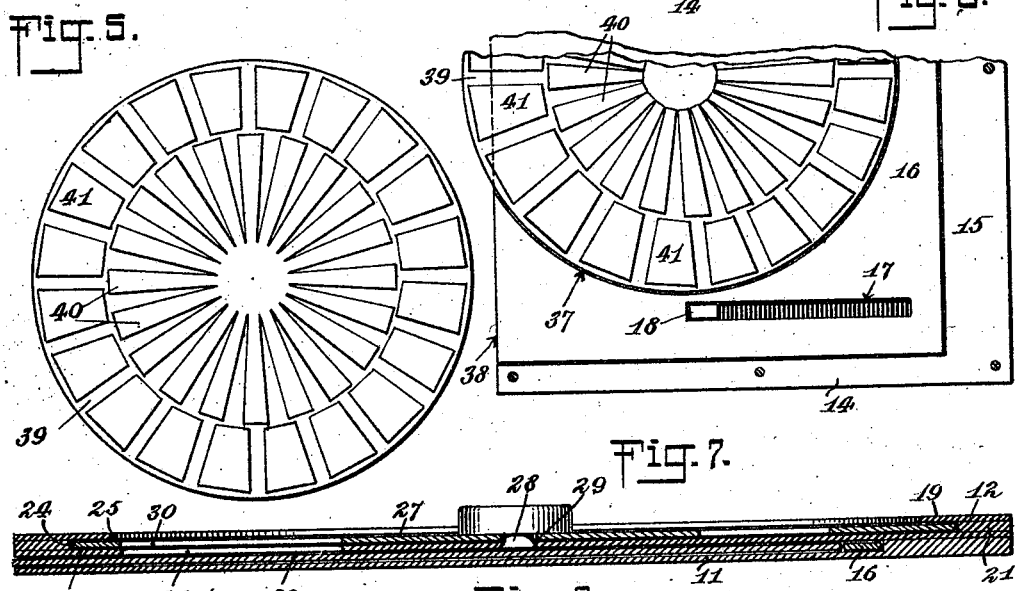
WITNESSES
INVENTOR
John H. Frome.
BY
ATTORNEYS Patented Oct. 12, 1926.

1,603,201

UNITED STATES PATENT OFFICE.

JOHN HENRY FROME, OF RUSHLAND, PENNSYLVANIA.

EDUCATIONAL APPLIANCE.

Application filed July 17, 1925, Serial No. 44,260. Renewed August 26, 1926.

This invention pertains to educational appliances and among other objects provides an improved medium to facilitate the teaching of primary pupils, the association of the name of an object with an illustration or pictorial representation of the object itself.

The invention further comprehends a device or apparatus by means of which the name of an object and the illustration or pictorial representation of said object are successively exposed to view so that the child can separately visualize and concentrate upon the name and the object in order to more thoroughly associate one with the other and therefore effect the creation of a more lasting impression upon the mind.

More particularly the invention contemplates a device or apparatus of the character set forth in which use is made of a housing having a movable shutter provided with a pair of window openings for successively exposing the title and the illustration or representation of the object and in which an element bearing a series of names or titles and illustrations or pictures of objects properly associated with each other capable of being selectively brought into position for coaction with the shutter.

As a still further object the invention provides means for detachably associating the element with the housing whereby elements having various pictures and titles may be used in connection with the same housing and shutter to increase the range of usefulness of the device.

The invention furthermore contemplates a device or appliance of the character set forth which is comparatively simple in its construction and mode of operation, inexpensive to manufacture and produce and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a face view of the device illustrating the shutter moved to a position to expose the title or name of an object.

Fig. 2 is a similar view with parts broken away and illustrating the shutter shifted to a position for exposing the illustration or pictorial representation of the object corresponding to the title or name.

Fig. 3 is a perspective view of the front panel shutter housing removed from the main body of the housing.

Fig. 4 is a front view partly broken away illustrating the title and picture bearing element removed from the housing.

Fig. 5 is a face view of the picture and title-bearing element removed.

Fig. 6 is a fragmentary vertical sectional view through the device.

Fig. 7 is a horizontal sectional view on an enlarged scale taken approximately on the line 7—7 of Fig. 1.

Fig. 8 is a similar view taken approximately on the line 8—8 of Fig. 2.

Referring to the drawings by characters of reference the device or apparatus comprises a rectangular housing 10 which includes side walls 11 and 12, top and bottom walls 13 and 14 and an end wall 15. The opposite end is open and slidably receives a snugly fitting carrier member 16 having a slot 17 which engages a lug 18 for limiting the outward projection of the carrier member from the housing. The side wall 12 is made up of outer, inner and intermediate plies or layers 19, 20 and 21. The inner layer 20 is provided with diametrically disposed window openings 22 and 23 while the intermediate and outer layers 19 and 20 are provided with concentric circular openings 24 and 25 the latter opening 25 being of lesser diameter than the opening 24 to define a substantially annular channel 26. A substantially disk-like shutter 27 of slightly lesser diameter than the opening 24 and of greater diameter than the opening 25 is received and mounted for rotation within the annular channel. To further assist in mounting and retaining the shutter 27 in place a concentric journal stud 28 is secured to the inner ply or layer 20 and extends through a concentric opening 29 in the shutter. The shutter is provided with complementary window openings 30 and 31 corresponding in size and configuration to the window openings 22 and 23. The openings 30 and 31 however are not disposed diametrically opposite but are so arranged that when the disk is rotated to bring the window opening 30 in registry with the window opening 22 the window opening 31 will be disposed out of alinement or registry with the window opening 23. In order to insure alinement of the window openings in the shutter with the window openings 22 and 23 and at the same time to limit the rotatory movement of the shutter, the said shutter is provided with a radially projecting integral lug 32 from its periphery which lug operates in a recess 33 formed in the intermediate ply or layer 21 and communicating with the opening 24 whereby the lug 32 respectively engages with the opposite ends 34 and 35 of the recess. The shutter is further provided with a manipulating handle or knob 36 which projects outwardly through the opening 25 in the outer layer or ply 19.

The carrier member 16 is formed with a circular cut-out portion 37 which is intersected at its outermost edge 38 and said cut-out portion is designed to receive for rotation a circular or disk-like element 39 upon the opposite faces of which are printed, inscribed or otherwise borne inner and outer annular series of titles 40 and illustrations or pictorial representations 41 of objects, the title corresponding to each object being disposed at a point diametrically opposite the illustration of the object to which it relates. When the carrier member 16 is projected from the housing 10 to the limit of its movement as illustrated in Fig. 4 the removal and application of the element 39 to the circular cutout portion 37 may be accomplished after which the carrier 16 with the element 39 positioned therein is shifted inwardly to the position illustrated in Figs. 1 and 2. It will be noted that the outer edge 38 of the carrier 16 is thus disposed flush with the open end of the housing 10 while a portion of the periphery of the element 39 is exposed beyond the open end of the housing 10 to facilitate turning movement of the element 39 to bring the various titles and objects to which they relate selectively into registry with the window openings 22 and 23. It will be further noted in this connection that the element 39 is disposed slightly eccentric to the axial center of the shutter 27 so that the inner series of titles 40 and the outer series of object illustrations 41 properly aline with the window openings 22 and 23. The teacher or instructor by then grasping the knob 36 and shifting the shutter 27 until the lug 32 first engages with one end wall 34 and the other end wall 35 of the recess 33 successively displays through the window openings the title and pictorial representation of the object to which it relates. By making the elements 39 removable and replaceable it is obvious that the range usefulness of the device is materially increased as any number of interchangeable elements 39 may be used in connection with the same housing and shutter.

I claim:—

1. An educational appliance, comprising a support, an element bearing a series of correlated titles and illustrations of objects mounted on said support for relative turning movement, said support having a wall overlying said element, and a rotary section on said wall having a pair of spaced window openings adapted upon rotatory movement to successively expose one set of correlated titles and illustrations to view.

2. An educational appliance comprising an element bearing a series of correlated titles and illustrations of objects thereon and means for successively exposing one set of correlated titles and illustrations to view, said means comprising a housing having a pair of window openings therein with which the sets of correlated titles and illustrations are selectively brought into registry and a shutter having a pair of window openings therein mounted for shifting movement on said housing to selectively dispose one of its window openings in registry with one of the housing window openings when the other window opening of the shutter is out of registry with the remaining window opening of the housing.

3. An educational appliance comprising an element bearing a series of correlated titles and illustrations of objects thereon and means for successively exposing one set of correlated titles and illustrations to view, said means comprising a housing having a pair of window openings therein with which the sets of correlated titles and illustrations are selectively brought into registry and a shutter having a pair of window openings therein mounted for shifting movement on said housing to selectively dispose one of its window openings in registry with one of the housing window openings when the other window opening of the shutter is out of registry with the remaining window opening of the housing, means for manipulating the shutter and means operable upon manipulation thereof to effect a positive registry of the shutter window openings with the housing window openings.

4. An educational appliance comprising an element bearing a series of correlated titles and illustrations of objects thereon and means for successively exposing one set of correlated titles and illustrations to view, said means comprising a housing having a pair of window openings therein with which the sets of correlated titles and illustrations are selectively brought into registry and a shutter having a pair of window openings therein mounted for shifting movement on said housing to selectively dispose one of its window openings in registry with one of the housing window openings when the other window opening of the shutter is out of registry with the remaining window opening of the housing and means for removably associating the title and illustration bearing element with the housing.

5. An educational appliance comprising an element bearing a series of correlated titles and illustrations of objects thereon and means for successively exposing one set of correlated titles and illustrations to view, said means comprising a housing having a pair of window openings therein with which the sets of correlated titles and illustrations are selectively brought into registry and a shutter having a pair of window openings therein mounted for shifting movement on said housing to selectively dispose one of its window openings in registry with one of the housing window openings when the other window opening of the shutter is out of registry with the remaining window opening of the housing and means for removably associating the title and illustration bearing element with the housing, said means comprising an element carrier member projectable from and retractible within the housing.

6. An educational appliance comprising a housing having an open end and provided with a pair of window openings in one side wall, a shutter having a pair of window openings therein and mounted for shifting movement on said wall to selectively dispose one of its window openings in registry with one of the window openings of said side wall when the other shutter window opening is out of registry with the other side wall window opening and a removable element bearing a series of correlated titles and illustrations of objects thereon, said element being capable of movement to selectively bring the correlated titles and illustrations into juxtaposition to the window openings in said housing wall.

JOHN HENRY FROME.